United States Patent [19]
McLarty

[11] 4,098,146

[45] Jul. 4, 1978

[54] TRACTION-DRIVE TRANSMISSION

[75] Inventor: Daniel R. McLarty, Plantsville, Conn.

[73] Assignee: Textron Inc., Providence, R.I.

[21] Appl. No.: 721,938

[22] Filed: Sep. 10, 1976

[51] Int. Cl.² .................... F16H 37/06; F16H 15/08
[52] U.S. Cl. .................................... 74/690; 74/200; 74/194
[58] Field of Search .................. 74/190, 200, 194, 690

[56] References Cited

U.S. PATENT DOCUMENTS

| | | | |
|---|---|---|---|
| 2,560,180 | 7/1951 | Lesueur | 74/200 X |
| 2,962,909 | 12/1960 | Jaquith et al. | 74/200 |
| 3,087,348 | 4/1963 | Kraus | 74/200 |
| 3,153,938 | 10/1964 | Perry | 74/200 |
| 3,165,937 | 1/1965 | Tomaszek | 74/200 X |
| 3,412,622 | 11/1968 | Rhodes et al. | 74/200 |
| 3,486,391 | 12/1969 | Kraus | 74/200 |
| 3,820,408 | 6/1974 | Louis | 74/200 |
| 3,933,054 | 1/1976 | Iseman | 74/200 |
| 3,986,414 | 10/1976 | Peterson et al. | 74/194 X |

Primary Examiner—Samuel Scott
Assistant Examiner—Lance W. Chandler
Attorney, Agent, or Firm—Hopgood, Calimafde, Kalil, Blaustein & Lieberman

[57] ABSTRACT

The invention contemplates an improved mechanical traction drive providing a single control whereby a desired range of speed ratios between input and output shafts is selectively available, without requiring clutch connection to the power source, such as an internal-combustion engine. The transmission involves a combination of completely mechanical friction-roller and meshing-gear planetary systems which are connected at all times, whether the single control is operated to call for a forward drive, a stop or a reverse drive of the output shaft. For the particular disclosed form, provision is made for automatic downshifting reaction to increasing load, the major axial-reaction forces are self-contained by rotating mechanism, thus (a) avoiding substantial axial force components on main-bearings of the mechanism, and (b) reducing to very small magnitudes the requisite force for selective control actuation.

13 Claims, 11 Drawing Figures

TRACTION-DRIVE TRANSMISSION

This invention relates to mechanical traction drives and in particular to those involving planetary systems of rolling and gear elements.

Structures of the character indicated which have thus far been proposed have suffered from such mechanical complexity as to render them uncompetitive with more conventional (e.g., clutch-operated) transmissions. They suffer from excessive parts wear and heat development and are, in general, inadequate to the task of driving such relatively small vehicles as golf carts, garden tractors, snow plows and the like. One improved mechanical traction drive of the character indicated offering technical and economic advantages with respect to the conventional drives of today is disclosed in copending Dickinson Application, Ser. No. 614,606, filed Sept. 18, 1975.

It is a general object of the invention to provide further improvement in mechanical traction drives of the character indicated.

A specific object is to provide an improved smoothly variable mechanical traction drive, particularly for relatively small vehicles which are subjected to frequent and massive changes in load, such as bull-dozing garden tractors, snow plows, and the like, the drive being disengageable as for parking or towing.

Another specific object is to meet the above objects with a planetary system utilizing but a single control actuator to selectively determine any given speed within a finite range which includes forward drive, stop and reverse drive of the vehicle, without changing the running condition of the drive motor or engine for the vehicle.

It is a further specific object to provide an improved transmission utilizing a traction-roller planetary system wherein automatic overload protection is afforded by "downshift" of the drive ratio, all within a predetermined limiting condition, such as 90 percent for the coefficient of traction for the rolling elements, thereby avoiding "gross skid", assuring rolling-contact action at all times, and avoiding engine or motor stall.

Still another specific object is to provide such a transmission wherein the parts are balanced and spring loaded to minimize shift-control force, particularly for speeds near what I term a "hold" condition, meaning zero or substantially zero output speed, without disturbing the continuously connected and running condition of transmission parts; still further in such a transmission it is an object to selectively provide total drive disconnection, using the same single shift-control means to establish a true "neutral", as when parking with the engine running.

Another specific object is to provide a transmission meeting the above objects and essentially confining the moving parts to a single subassembly, which is bodily removable from the transmission housing for ready service and repair.

A general object is to meet the above objects with basically simple mechanism, of relatively great mechanical effectiveness, and of such low cost as to be competitive with conventional transmissions of lesser technical capability.

Other objects and various further features of the invention will be pointed out or will occur to those skilled in the art from a reading of the following specification in conjunction with the accompanying drawings.

In said drawings, which show, for illustrative purposes only, a preferred form of the invention:

FIG. 3 is an exploded view in perspective, to show the planet-member carrier of my transmission;

Figure 1:
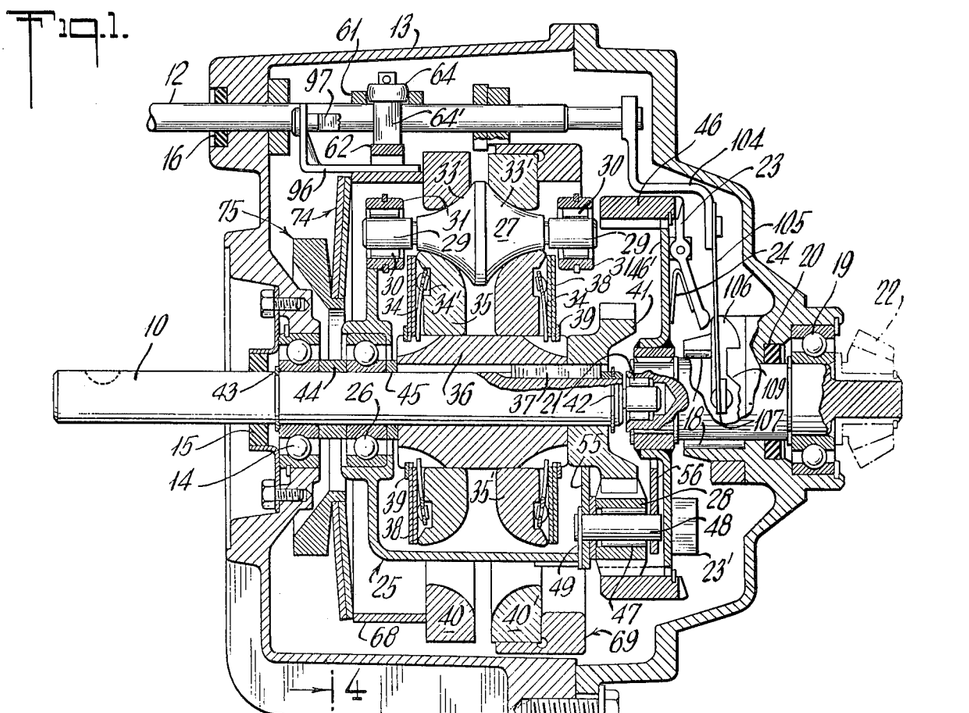
FIG. 1 is a partly broken-away longitudinal sectional view through a traction-drive transmission of the invention.

Referring initially to FIG. 1, the traction drive of the invention accepts continuous input rotation of a drive shaft 10 (as from an internal-combustion engine, not shown) and converts the same to forward drive, "hold" (stop), or reverse drive of an output shaft 11, all in accordance with the selective longitudinal positioning of a single control-rod element 12; the same control-rod element 12 is also selectively angularly shiftable to totally disengage the drive to a true "neutral", as for parking or towing conditions. The transmission will be described in the context of illustrative use on a small vehicle such as a lawn or garden tractor equipped as for bulldozer, snow-plowing or the like duty, for which the engine may be in the range of 10 to 20 horsepower, but the principles of the invention will be understood to be of greater range of application. And remote actuation of control element 12 will depend upon particular application convenience, with connection to the outwardly exposed end of element 12; for example, in a manually operated application, an externally projecting control arm 12′ (FIG. 1A) may be clamped to rod 12 beneath a suitably slotted cover plate 13′, providing slightly offset "forward" and "reverse" longitudinal guide slots for arm 12′ (offset $\delta_1$), with a much greater offset ($\delta_2$) between them to permit approximately 30° rotational shift of rod 12, from "hold" to "neutral" selection, as will later become clear.

The transmission is contained in a relatively small cup-shaped housing body 13, in the closed end of which the input shaft 10 is supported by an antifriction bearing 14 and is suitably sealed by means 15. The control element 12 is slidably supported through and sealed at 16 to an upper part of the closed end of body 13. The housing is closed by a removable end bell 17 having a central hub in which the output shaft 11 is shown supported by spaced needle and ball bearings 18–19 and is suitably sealed at 20. Shafts 10–11 include telescoping ends, with interposed needle-bearing means 21; and a load is symbolized by an output bevel gear 22.

THE PLANETARY SYSTEMS

Within the housing 13, and as part of a complete subassembly carried by the input shaft 10, a single planet-element carrier 25 is rotatably mounted by bearing means 26 on shaft 10; the carrier 25 angularly positions and carries plural planet rollers or wheels 27 and plural planet gears 28 in equal angularly spaced interlaced relation, thereby interconnecting traction-roller and meshing-gear planetary systems, to be described. Preferably, there are three planet rollers 27 and three planet gears 28. Each roller 27 has projecting rotary-support ends 29 riding in needle bearings 30 in slide members 31, and members 31 are in turn guided by radial guide slots 32 in the carrier 25, to be more fully described in connection with FIG. 3.

Each planet roller 27 is a single rigid element characterized by two like rolling-contact surfaces 33-33' which are truncated-toroidal and concave; surfaces 33-33' are sloped in generally axially-opposite and radially outward orientation, and the surfaces 33-33' may each be the surface of revolution of a circular arc, about an axis outside the circle from which the arc is taken.

The traction-roller planetary system comprises two like sun wheels 35-35' mounted for independent and keyed axial sliding upon a drive sleeve 36, keyed at 37 to the input shaft 10; coupling means in the form of an axially flexible and torsionally stiff plate 34 is shown as the means of establishing a keying connection from sleeve 36 to local key recesses 34' in the sun wheels 35-35'. The outer surfaces of wheels 35-35' are convex and of opposed slope orientation, each being preferably the surface of revolution of a circular arc, of radius less than that of the circular arc defining the respective planet surfaces 33-33'. Opposed Belleville washers or springs 38 are retained on sleeve 36 by snap rings 39 to establish a predetermined axially squeezing preload force of sun wheels 35-35' against the respective planet surfaces 33-33', thus applying a radially outward force which tends to outwardly displace the planet rollers 27. This displacement and force are opposed by similar axially inward squeezing force applied to two reaction rings 40-40', having antirotational support in housing 13. Such support and the control and variation of squeezing force action upon reaction rings 40-40' will be the subject of later and more detailed discussion, in connection with control by rod 12 and by load-responsive downshift mechanism. It suffices here to note that the inwardly facing rollingcontact surfaces of reaction rings 40-40' may, like those of sun wheels 35-35', each be defined as a surface of revolution of a circular arc of radius less than that of the circular arc defining the plural planet surfaces 33-33'.

Figure 2:
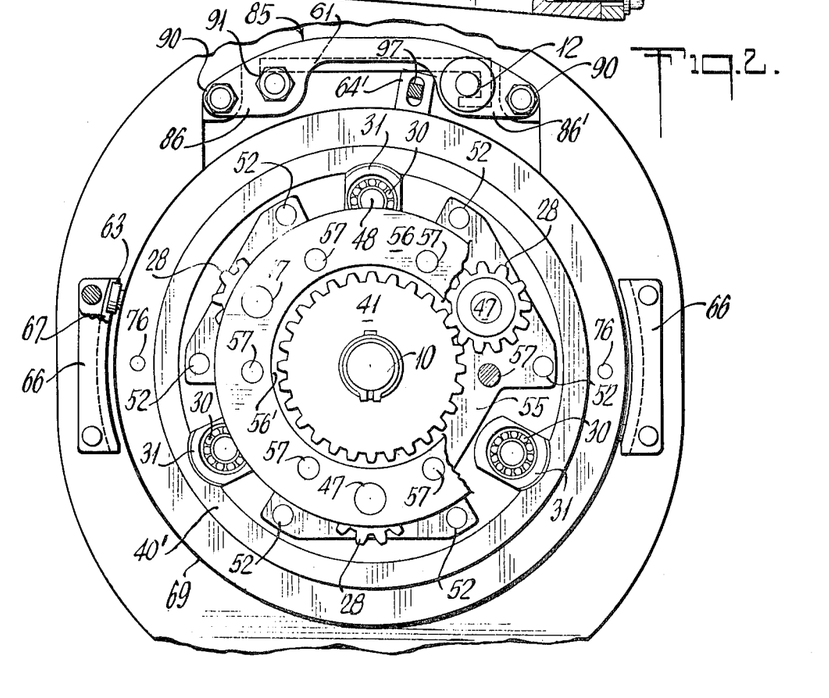
FIG. 2 is a right-end view of the mechanism of FIG. 1 after its right-end cover and output subassembly have been removed.

The meshing-gear planetary system comprises a drive or sun gear 41, keyed at 37 to shaft 10 and axially retained by and between snap rings 42-43, along with sleeve 36, the inner rings of bearings 14-26, and axial spacers 44-45 as appropriate. Gear 41 is in constant mesh with the planet gears 28, and the latter are in constant mesh with the inwardly facing teeth of a ring gear 46 carried by a plate 46' that is keyed to the output shaft; for total-drive disengagement, ring gear 46 is freely rotatable on plate 46', and under drive conditions a clutchdog rocker arm 23 pivotally mounted to plate 46' is spring-urged by means 24 to engage one of a plurality of dog slots in the adjacent end of ring gear 46. Each planet gear 28 is seen in FIGS. 1, 2 and 3 to be needle-bearing mounted at 47 to a support pin 48 that is fixedly retained by means 49 to part of the carrier structure 25.

The carrier 25 is seen in FIG. 3 to be essentially an assembly of a planet-roller retainer casting 50 and a planet-gear cage subassembly 51, bolted together by means 52. Basically, the casting 50 is a continuous plate-like ring at its bearing-supported end 53, and formed with integral arcuate angular segments 54 which extend axially and which are angularly spaced as needed for planetroller clearance at the respective radially slotted guide locations 32. The planet-gear cage subassembly 51 comprises annular plates 55-56, axially spaced and retained by spacing rivets 57. The plate 55 has three lobe-like projections to enable securely bolted fastening of these projections to the respective body segments 54; the plate 56 is circular and suitably bored at angularly spaced locations for support of the three planet-gear pins 47. As best seen in FIGS. 2 and 3, the aligned central openings 55'-56' of plates 55-56 clear the teeth of gear 41.

ANTIROTATIONAL SUPPORT AND SQUEEZE CONTROL OF REACTION RINGS 40-41'

Figures 1A, 5:
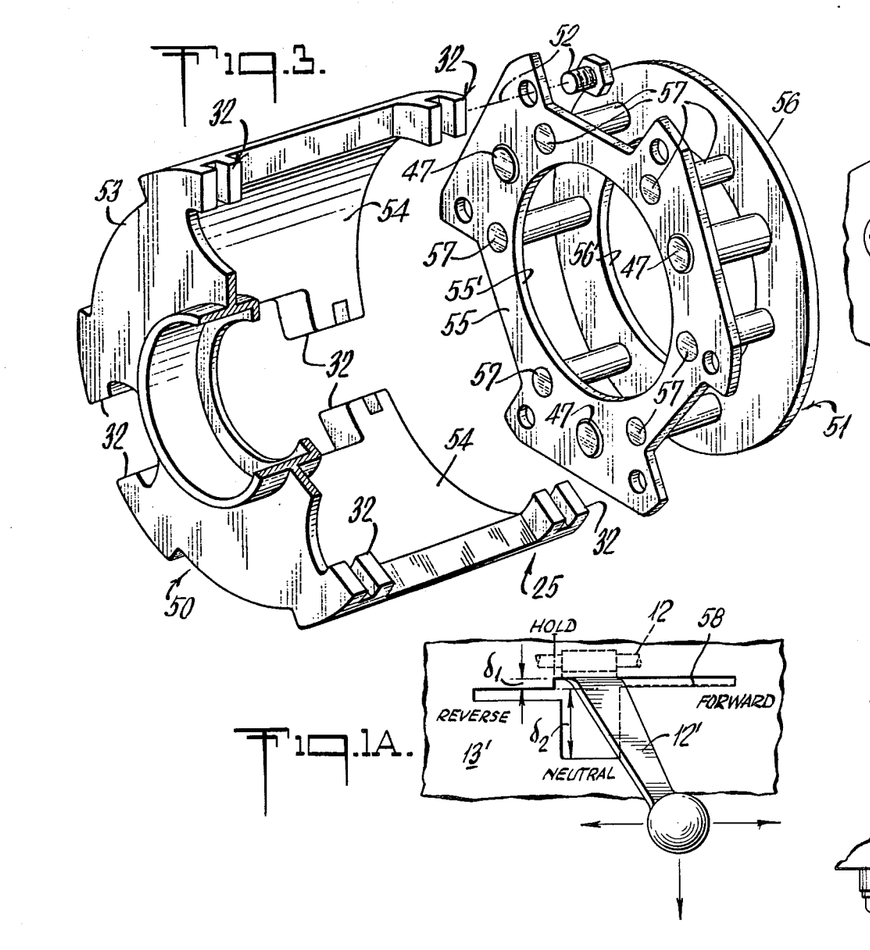
FIG. 1A is a simplified diagram to illustrate manually operated control-selection means for the transmission of FIG. 1.
FIG. 5 is a view in side elevation, to show control parts.
Figure 4:
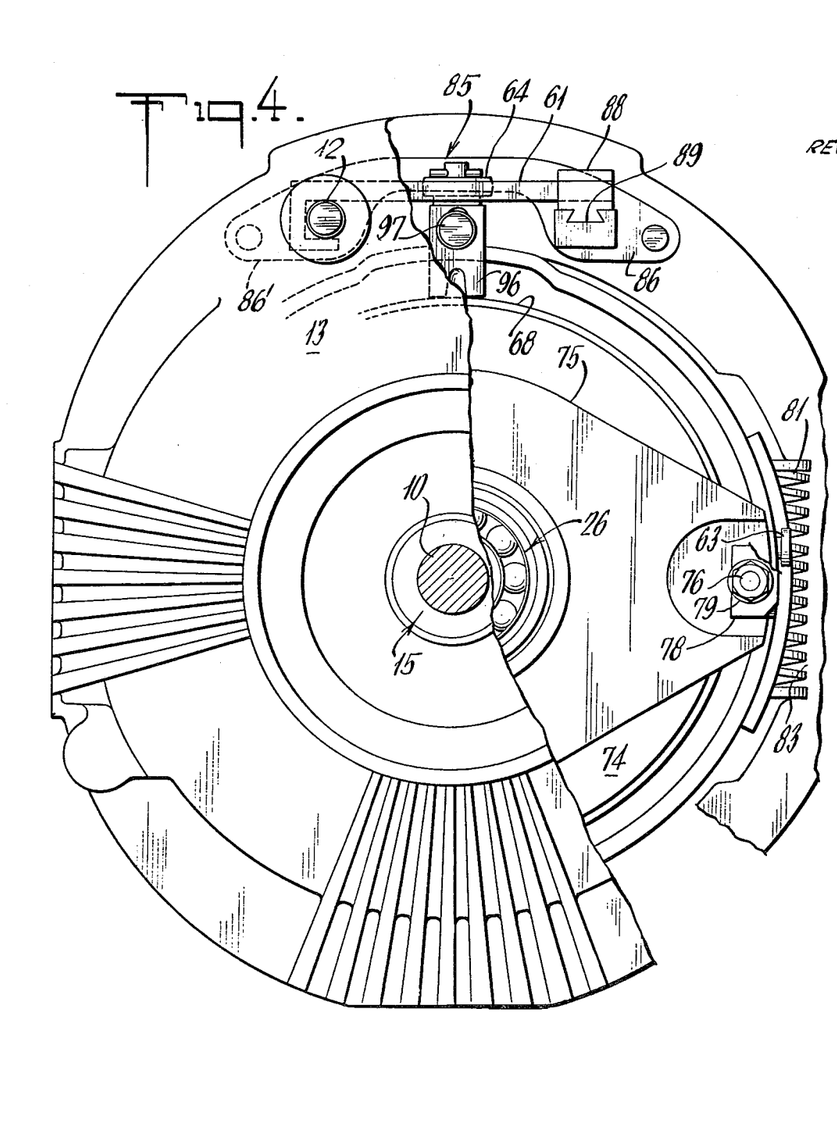
FIG. 4 is a left-end view of the mechanism of FIG. 1, with the housing partly broken-away to reveal control parts.
Figure 5:
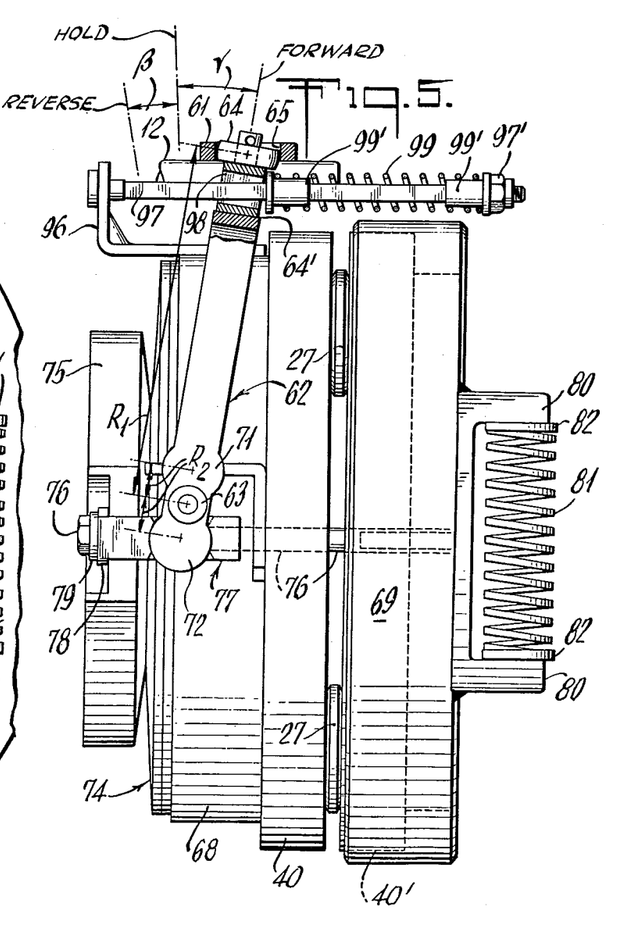
Figures 6, 8, 9, 10:
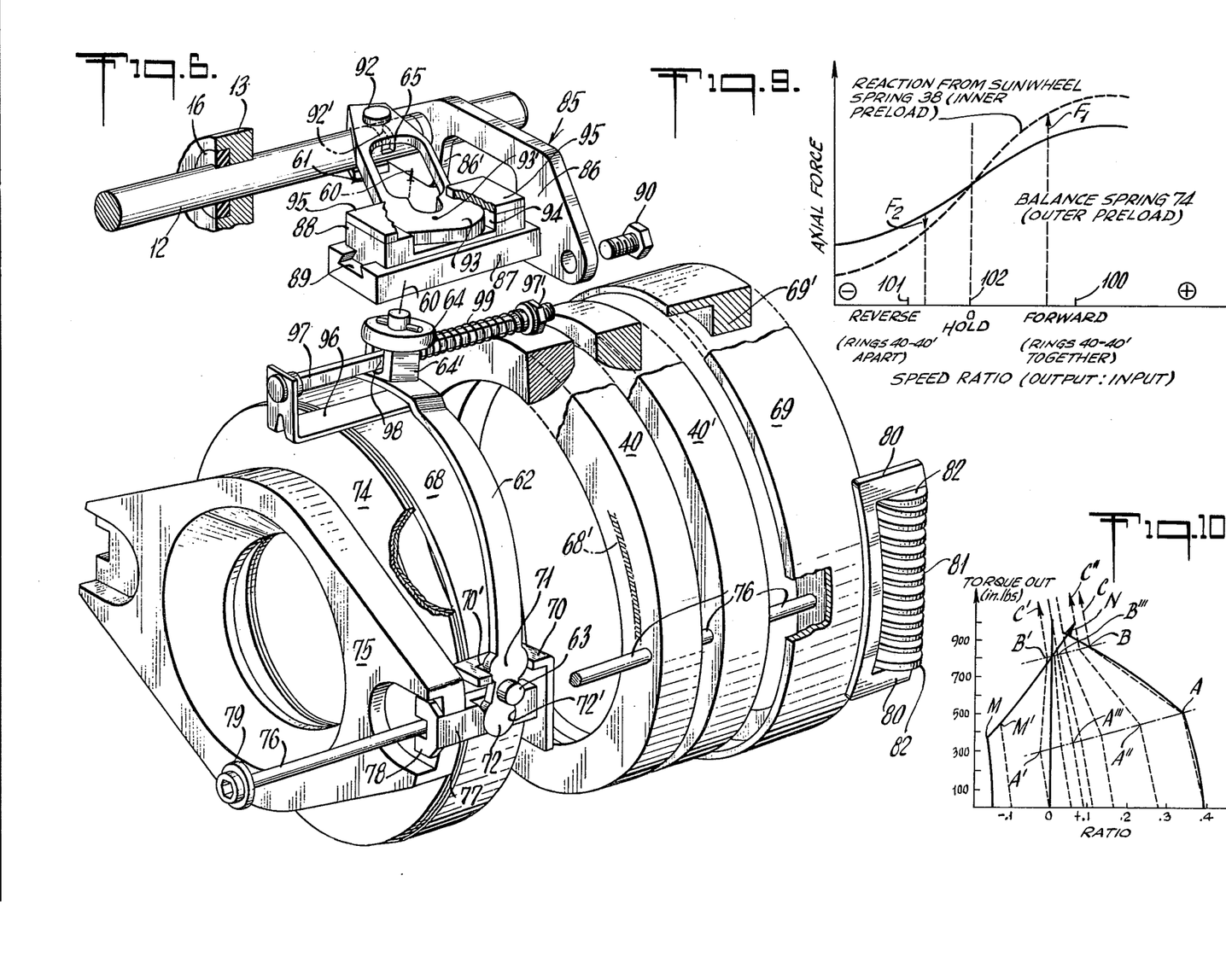
FIG. 6 is an exploded view in perspective of load-responsive shift-control mechanism of FIG. 1, partly broken-away to reveal an overall parts relationship.
FIGS. 7 and 8 are enlarged fragmentary views of shift mechanism of the invention, taken respectively for the aspect of FIG. 4 and in plan view.
FIG. 9 is a graph to depict spring characteristics in use in the mechanism of FIG. 1.
FIG. 10 is a graph to depict performance characteristics, namely output torque for various selected transmission ratios in the transmission of FIG. 1.

Primary reference is made to FIGS. 4, 5, and 6 in describing mechanism whereby torsionally reactive antirotational support is provided for the reaction rings 40-40' and whereby a selectively applied control positioning of the shift rod 12 is subject to automatic load-responsive correction. Basically, the mechanism comprises (A) a torsionally resilient suspension of an axially preloaded squeezing subassembly, shown in exploded array in the lower part of FIG. 6, and (B) cam-operated means referenced to the housing and associated with shift rod 12, shown as a subassembly in exploded offset (on the alignment 60) from the squeezing subassembly. The shift axis of rod 12 is longitudinal and parallel to the central axis of the planetary systems (i.e., to the axis of reaction rings 40-40'); and selected positioning of rod 12 is translated, via cam means 61 and a cam-following arcuate yoke 62 having pivoted reference at 63 to an axially fixed location in the housing, into corresponding changes in squeeze action. The yoke-pivot roll 63 is one of two, at substantially diametrically opposed locations on the respective arms of yoke 62, and a cam-follower roll 64 on a pedestal 64' at the midpoint of yoke 62 tracks shift-rod position via a guide or cam slot 65 in means 61. The frame-reference for yoke pivots 63 will be seen in FIG. 2 to be provided by like diametrically opposed blocks 66, secured to housing 13, and each having an arcuate guide channel 67 in which the yoke pivot 63 is axially captive with a limited freedom for arcuate displacement.

The squeezing subassembly comprises spaced outer sleeve members 68-69 in axial abutment with the respective reaction rings 40-40'; the radius at which sleeve 68 thus abuts reaction ring 40 is suggested by shading between spaced arcuate phantom lines at 68' in FIG. 6, while the other reaction ring 40' is seated within a locating skirt and against a body portion 69' of sleeve 69. Sleeve member 69 includes spaced brackets 70, recessed at 70', to engage and track the instantaneous axial position of a first crank region 71 of each of the yoke arms, while a second crank region 72 of each of the yoke arms is used for similar axial-position tracking by the other sleeve member 69. Since regions 71-72 are on opposite sides of the axis of yoke-pivot means 63, the axial displacements of sleeves 68-69 are equal and opposite, in response to yoke actuation. Stiffly compliant Belleville-spring means 74 is relied upon to apply a squeezing preload of sleeves 68–69 upon rings 40–40′; as shown, the outer radial limit of spring means 74 acts (to the right, in the sense of FIGS. 1, 5 and 6) on sleeve 68, while a diametrically extending beam 75 receives equal and opposite action from the inner limit of spring means 74. Two tie rods 76 connect diametrically opposite ends of beam 75 to corresponding diametrically opposite locations on the sleeve body 69′, so that spring action on beam 75 is directly translated into spring action (to the left, in the sense of FIGS. 1, 5 and 6) upon sleeve 69. Each connection of a tie rod 76 to an end of beam 75 is seen in FIG. 6 to involve a tie-rod guide member 77 which comprises a longitudinal channel to receive and locate the associated tie rod 76, the channel body being in turn located in an outwardly slotted end of beam 75; flanges or ears 78 on each member 77 bear against beam 75 at the edges of each end slot thereof, and a washer 79 beneath the head of each tie rod 76 seats against the flanges 78 of the adjacent guide member 77. Finally, a local recess 72′ at a longitudinally central region of each guide member 77 coacts with yoke region 72 to respond to a shifted displacement of follower 64.

From the foregoing description of the squeezing subassembly, it will be understood that the instantaneous axial spacing of outer rings 40–40′ is always and solely a function of the instantaneous angular position of yoke 62 about its pivot means 63. The force with which such spacing (of rings 40–40′) is held will be that which is held will be that which is needed to achieve equilibrium with the instantaneous radially outward displacement force of planet rollers 27. The relatively great mechanical advantage attributable to the predominance of follower-crank radius $R_1$ over actuation-crank radii $R_2$ (see FIG. 5) means a correspondingly reduced reaction force as viewed along the displacemement axis axis of control rod 12, but I prefer to select the force characteristic of spring means 74 so as to provide a "preload" force in such opposition to the radially outward displacement force of planet rollers 27 that a nominal or "hold" position of yoke 62 is naturally retained. Thus, any adjusted shift of rod 12 from its "hold" position will only involve differential actuation of the respective ends of the squeezing subassembly, so that control-force magnitudes can be kept at relatively very low levels, involving minimum reaction upon the housing or upon the control mechanism.

A description of the squeezing subassembly is completed by noting that both tie rods 76 pass through aligned locating apertures in each of the reaction rings 40–40′ and in the radial-plane wall of each of the brackets 70, thus assuring angularly keyed integrity of all parts of the subassembly. Additionally, the sleeve 69 is provided with diametrically opposed pairs of angularly spaced arms 80; between each pair of arms 80, a compressionally preloaded spring 81 is seated on pads or washers 82. A substantial fraction of each pad 82 projects radially outside arms 80 for torsionally resilient reacting engagement with adjacent side-wall regions of diametrically opposed local recesses 83 in housing member 17; these recesses may be seen in FIG. 4, but springs 81 have been omitted from FIG. 2 in order to permit viewing and identification of the guide blocks 66 for yoke-pivot action (already described).

The upper non-rotatable control portion of FIG. 6 will be seen to comprise a mounting plate 85 of sheet metal and establishing a guide for rod 12 with enlarged outer ends 86–86′, to permit secure bolting, by means 90, to the interior of housing 13 (see also FIG. 2). Rod 12 has a circumferential groove for longitudinal-position tracking by the forked end (92′) of a pin 92 near the adjacent end member 61. A bracket arm 87 is secured to and projects from the mounting-plate enlargement 86, providing extended frame reference for a slide block 88; block 88 has a dovetail-guide (89) relation to arm 87, being adjustably positionable through selected setting of a lead screw as suggested at 91 in FIG. 2. The unpinned end 93 of control plate 61 is arcuately contoured for guidance between spaced shoulders 94 of a transverse groove in block 88, and capping plates 95 on the shouldered regions of block 88 sufficiently overlap the groove for captive retention of end 93 of the control member 61. Thus, control member 61 and its cam 65 span a range of angular positions of follower 64 about shafts 10–11, and throughout this range, cam-follower roll 64 is in constant tracking engagement with the cam 65.

It will be seen (FIG. 8) that an axial shifting of rod 12 will cause pin 92 to pivotally displace cam plate 61 about an instantaneous center 93′ of the rounded end 93 of plate 61, at a frame-reference longitudinal location determined by the setting at 91, for block 88 in its guide 89. Such displacement of plate 61 will change the instantaneous location of cam-follower (64) engagement along cam 65, thereby imparting a rotational displacement of yoke 62 about its pivot means 63, and thus directly changing the axial spacing and, therefore the squeezing action of reaction rings 40–40′, as well as the preloaded condition of spring means 74. As will later be more clear, the position of block 88 is preferably set at 91 such that the instantaneous center 93′ is in the same radial plane (about shafts 10–11) as is the effective center of follower roll 64 when in "hold" position; and the effective longitudinal location of shift arm 12′ when in the wide slot between "hold" and "neutral" positions, is set such that the effective axis of cam 65 is in this same radial plane (see phantom-line location 65′ in FIG. 8). Thus, in "hold", no amount of load reaction will be effective to shift the fork 62 out of "hold" position.

THE BELLEVILLE SPRINGS AND THEIR LOADING

As already noted, each positional adjustment of the spacing of reaction wheels 40–40′ is accompanied by a positional shift of the planet rollers 27, in radial direction and extent, against the compressional preload of the sun wheels 35–35′ (due to the combined effect of springs 38). The spring means 74 merely relieves the net force encountered at control rod 12; the characteristic and preload level of spring means 74 are selected to substantially match or offset the instantaneous axial-force reaction from the preloading springs 38. In terms of control-rod (12) positioning, the net traction-drive ratio will always depend primarily upon (a) the current positional setting of control rod 12 and (b) such corrective modification of the pivoted angle of yoke 62 as is achieved for such setting by reason of load-reacting influence upon the antirotational springs 81 and the cam means 65–64. For the present illustration in which forward, stop ("hold") and reverse drives are selectively available, such availability of "hold" (zero output speed) applies under load as well as under no-load conditions; the control-rod position necessary to achieve "hold" will always be the same, but the cam follower 64 will assume various positions along the straight length of cam 65, depending upon the load condition. In any event, however, the above-noted spring reaction, between inner-spring means 38 and the balancing or offsetting effect of the outer-spring means 74, will always be operative upon the mechanism, and FIG. 9 is intended to assist in an appreciation of this point.

First, however, a preference is stated for the use of so-called Belleville springs at 38–74 because they have the property of exhibiting a negative-rate coefficient for axial deflections beyond that deflection at which their positive-rate coefficient ends. This positive-negative character of the Belleville spring coefficient applies to such springs as are merely dished (frusto-conical) washers, as well as to such springs which are additionally characterized by radially slotted or other special features. Thus, the use of the expression "Belleville" herein is not to be understood as limiting the invention to plain frusto-conical washers. And in the preferred employment of my invention, such springs 38 are under such preloaded condition as to assure operation at all times in the negative-rate portion of their respective coefficients.

FIG. 9 is a simplified illustration of the use of the outer preloaded balance spring means 74, in offsetting relation to the preloaded force reaction from the sun-wheel spring means 38. The solid-line curve will be seen to represent the characteristic of balance spring 74, with axial force plotted in terms of increasing speed ratio, forward being taken as positive. The selected usable range of spring means 38 is taken over the negative-rate portion of the curve, between limits 100–101 of "Forward" and "Reverse" transmission, i.e., speed of output shaft 11 in relation to speed of input shaft 10; this speed ratio will be zero for the "Hold" condition 102. Parenthetic legends indicate that for greater speed ratios in the forward direction, rings 40–40' are squeezed more together (spring 74 being less compressed), and that for reduced speed ratios including reverse, rings 40–40' are displaced more apart from each other (spring 74 being more compressed), all in accordance with shift yoke positions suggested by legend in FIG. 5. Thus, over the range 101–100 depicted in FIG. 9, rings 40–40', most separated at 101, are brought more together in the course of shifting through "hold"; throughout this direction of shifting through the range 101–100, spring 74 is progressively expanded or decompressed, but in view of its negative-rate operation in this range, the preload force of spring 74 increases. By the same token, shifting displacements which move rings 40–40' more apart are accompanied by decreasing preload force of spring 74.

For an assumed condition, in which "Hold" is the desired equilibrium (i.e., with shift rod 12 in its "Hold" position, and with moderate to no load-torque reaction at 22), the reaction characteristic from the preloaded sun-wheel springs 38 (see dashed-line curve) is manifested as a spreading-displacement force between reaction rings 40–40', i.e., counterclockwise reaction moment on yoke 62 in the sense of FIGS. 5 and 6, and is seen to have been selected so as to cross or balance the solid-line curve at the "Hold" point 102. With any shift-rod (12) displacement from "hold" and in the forward direction, a directional difference force $F_1$ develops between the inner and outer spring systems (system 38 prevailing); the outer-ring squeezing which was accompanied by development of this force $F_1$ institutes a radially inward displacement of the planet rollers 27 and a spreading of sun wheels 35–35' (with accompanying change in output speed ratio). And because of the indicated negative-rate nature of all spring systems, the requisite planet-wheel displacement response is quickly achieved with only mildly increased resistance. For shift-rod displacement from "hold" and in the "reverse" direction, a similar but oppositely-poled mild difference force $F_2$ develops (system 74 prevailing), to quickly accommodate the radially outwardly urged displacement of the planet rollers 27 (due to accompanying axially approaching displacement of sun wheels 35–35'). Thus, for any speed selection at 12, the maximum reaction forces $F_1$, $F_2$ are of relatively small magnitude but are nevertheless of such polarity as to aid in returning the mechanism to the "hold" position, subject of course to the dragging resistance involved in restoring control rod 12 to its "hold" position; for a manually operated selection system, as via shift arm 12', I prefer that at least the forward guide slot shall include a rub strip or other means (schematically suggested by heavy dashed line 58, in FIG. 1A) for enhancing this dragging resistance and thus retaining a given "forward" selected position of arm 12'.

For many applications, the mechanism as described will be perfectly satisfactory, but FIGS. 5 and 6 additionally illustrate a feature to provide stronger resilient force to urge the shift yoke 62 and its follower 64 away from the extreme-forward displacement positions. For such action, a mounting bracket 96 is fixed to sleeve 68 and retains the headed end of an elongate square-section guide rod 97, keyed against rotation by opposed walls of a radially slotted opening 98 in pedestal 64'; and a compression spring 99 on rod 97 is preloaded against pedestal 64', between bushings 99' and in accordance with preload adjustment of threaded means 97'. As yoke 62 is shifted to the right (forward speed selection), pedestal 64' is shifted to further compress spring 99, with the result that spring 99 will tend to return yoke 62 to the neutral or to a less-than-full forward speed position.

Quite aside from the foregoing, it will be recalled that means external to the traction drive may be provided to retain selection of the "hold" drive-ratio position of shift rod 12, as suggested by the frame-based slot system of FIG. 1A.

OPERATION OF AN ILLUSTRATIVE TRANSMISSION

For an illustrative embodiment wherein a 20 H.P. engine is to drive the shaft 10 for a range of FIG. 9 speed ratios and in which the limits 100 and 101 are respectively in the order of +0.4:1 and −0.15:1, I have successfully employed a 2:1 planetary gear ratio wherein sun and ring gears 41–46 are of 28 teeth and 56 teeth, respectively, and wherein three 13-tooth planet gears 28 orbit on a 3.6-inch diameter circle. At the same time, the traction-roller planetary system has used planetary rollers 27 in which the curvature radius of the concave rolling surface is 1.385 inches, a 40° arc of this radius being used to generate each concave surface of revolution, wherein the center for the curvature radius is taken at 1.58-inch offset from the roller axis; to coact with this planet-roll structure, each sun wheel and each reaction wheel has a convex rolling-surface curvature of 1.066-inch radius, a 40° arc of this radius being at 1-inch offset from the sun-wheel axis, and a 20° arc of this radius being at 3.63-inch offset from the reaction-ring axis, to generate the respective convex surfaces of revolution. The parts are run in a friction oil, an acceptable product being the Monsanto Co. synthetic hydrocarbon traction fluid commercially known as SANTOTRAC-50.

In the "hold" setting of the shift yoke 62, and for the indicated specific embodiment, the effective radius of the orbiting circle of planet rollers 27 is such that the carrier 25 rotates at approximately one third of the speed of input shaft 10, and in the same direction as the input shaft. For "Forward" output speeds (at shaft 11), carrier 25 rotates at more than one third of the input shaft, for example up to approximately two thirds of input shaft speed; for "reverse" output speeds, carrier 25 rotates at less than one third the speed of the input shaft, for example down to approximately one fourth of input shaft speed. In every case, it is the effective instantaneous radius of the orbiting circle of the planet rolls which determines such carrier rotation, and it is the current pivoted orientation of yoke 62 which determines the effective orbit-circle radius.

Figure 7:
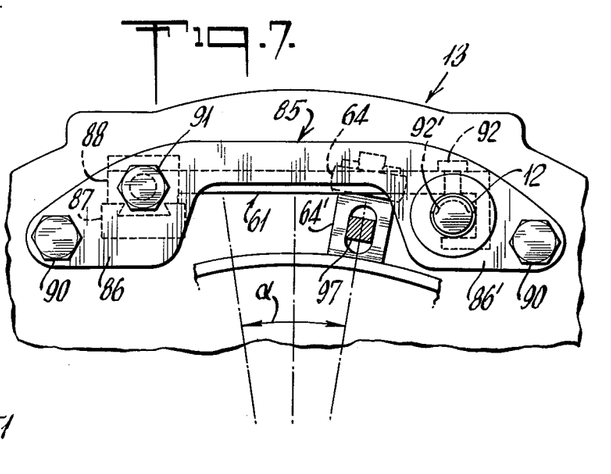
Figure 8:
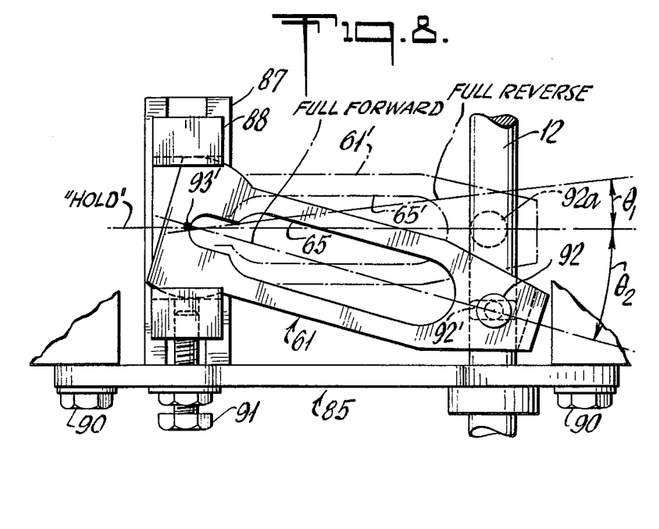

In "hold", the cam plate 61 will be in the position shown at 61' in FIG. 8, the shift rod 12 being pushed forward for forward-drive selection, as to the solid-line position of plate 61 in FIG. 8. Under a zero or substantially zero-load condition, the follower roll 64 is preferably positioned, by torque-reaction spring 81, near that end of cam 65 which is nearest pin 92 and, therefore, at substantial radial offset from the pivot center 93' of cam plate 61. Thus, for forward drive of a load, there will be a first direction of counter-rotational torque sustained by housing 13 via springs 81 and the outer-ring squeezing assembly (lower part of FIG. 6), such counter-rotational torque involving angular displacement of said outer-ring squeezing assembly against springs 81; the maximum extent of this angular displacement is indicated $\alpha$ in FIG. 7, is determined by the length of cam 65, and involves progressively small pivot-angle offsets of the shift fork 62 (about its pivots 63) with respect to the "hold" position thereof. For "reverse"-selected drive of a load, there is a similar counter-rotational torque in the opposite direction, but cam follower 64 will be urged in the direction of the adjacent end of cam slot 65 and will therefore remain in its FIG. 7 solid-line position throughout the lesser range of reverse-speed ratio selection; the lesser range $\beta$ of reverse-drive selection, as compared with the greater range $\gamma$ of forward-drive selection are shown by legends in FIGS. 5 and 9.

Automatic downshifting and upshifting will be seen to be characteristic of the described mechanism, upon additional reference to FIG. 10. FIG. 10 is illustrative of performance when the cam 65 of plate 61 slopes negatively at an angle $\theta_1$ of about 5° (for the "Hold" condition) with respect to a radial plane of the central axis 10–11, said angle being identified in FIG. 8; also, for the FIG. 10 illustration, a maximum "forward" no-load ratio of 0.4 is attainable for a cam 65 slope $\theta_2$ of about 20°, positive with respect to the same radial plane.

For any given "forward" selection, say the maximum ratio of 0.4:1, as between output speed (11) and input speed (10), increasing load is characterised by a "normal" speed reduction or droop due to internal slippage, until about 50 percent of maximum output torque is delivered, point A in FIG. 10, for an illustrative preload of springs 81. Point A is on a first sloping alignment, to point A', which alignment determines the onset of load-torque reaction sufficient to commence displacement of cam-follower 64 in its movement down cam 65. Such movement necessarily entails a downshifting axial displacement of follower 64 and a corresponding rotation of its supporting yoke 62 about pivots 63. The extent of downshift depends upon load-torque reaction, via springs 81, and accounts (along with normal slippage) for a more steep response characteristic, from point A (about 500 in-lb. torque output) to point B (about 880 in-lb. torque output); with such downshifting, there is accompanying speed reduction, from 0.4 to about 0.35 at point A, and to about 0.1 at point B. Point B is on a second sloping alignment, to point B', and is determined by the fact that cam-follower roll 64 has come to the other end of cam 65 (near pivot center 93'). Further reaction to increasing load torque can no longer be accommodated by cam 65 (for its stated slope setting) and so performance will follow the alignment B–C, parallel to the initial slope from no-load to point A, until some part of the rolling system breaks traction.

Similar interpretations of FIG. 10 may be made for each of a plurality of rod (12)-selected slope orientations of cam 65. Thus, for an initial n-load speed-ratio selection of 0.285:1, speed falls off at the normal slip rate until intersection at A" with the alignment A–A', whereupon load-torque reaction is operative to shift follower 64 in its path down cam 65. This continues until follower 64 abuts the low end of cam 65, denoted B", on the alignment B–B', at which point output torque is a little more than 80 percent of maximum, and the transmission ratio has been downshifted to approximately 0.08:1.

FIG. 10 is further of interest for its display of the straightline characteristic which begins at a no-load transmission ratio of about 0.09:1 and slopes at the normal speed-droop rate for its entire length, involving no change in direction at its intersections A'" with alignment A–A' or B'" with alignment B–B'. This characteristic will be understood to apply for the phantom position 65' for cam 65 in FIG. 8, wherein cam 65 is in a radial plane, i.e., perpendicular to the transmission axis.

The indicated course of speed reduction, for the 0.4:1 speed selection and via points A and B (and for all lesser "forward" selection ratios), will be seen to be within an outer envelope (solid-line curve) which represents theoretical performance where 90 percent of the traction limit of rolling-contact parts is taken as the safety limit; in other words, rolling-contact traction may be achieved at higher loads on these parts, but 90 percent provides an adequately safe margin upon which to rely. The extension of solid-line curve A–B beyond point B would apply only if the cam 65 were of greater length, it being recalled that the performance curve proceeds in the direction C from point B because follower 64 intercepted the end of the particular cam 65 shown.

In similar fashion, FIG. 10 shows with another solid-line curve the full-reverse selection available to the extent of a reverse-drive ratio of 0.146:1. From the no-load condition for this selection, the same negative-slope "normal" speed droop is seen to occur for increasing load torques, to a point M (about 400 in-lbs.), beyond which the slope from M in the direction N completes a definition of the region within which the above-mentioned 90 percent traction limit applies for the transmission; for example, M is the point at which this 90 percent limit is reached for maximum reverse-ratio selection, and M' is the corresponding limit achieved by selecting the lesser reverse ratio of 0.1:1.

"HOLD" TO "NEUTRAL" SHIFT

Even though the transmission of my invention may be manually shifted to "hold", i.e., to a condition wherein the transmission is running and fully connected to the output shaft 11, but wherein output shaft rotation is zero or substantially zero, further provision is made for attainment of a true "neutral", meaning total disconnection of the transmission from the output shaft. In the form shown, this provision is made at one or more dog-clutch arms 23, by clockwise rotation of the same (in the sense of FIG. 1) to free arm 23 from dog engagement with ring gear 46, thus severing the connection between ring gear 46 and its supporting plate 46'. This disengagement is accomplished by the approximately 30° rotation of rod 12 when selector arm 12' is angularly displaced across the span $\delta_2$ of the "Hold"-"Neutral" slot region in plate 13' (FIG. 1A), as will now be described.

At the rear end of the transmission, selector rod 12 is fitted with a crank arm 104 which is suitably formed with longitudinal and radial offsets to clear ring gear 46 and the inner wall of end bell 17, for all possible longitudinal and angular settings of rod 12. At its outer end, crank 104 has pin-and-slot engagement to a plate 105 in the form of a horseshoe, spanning a diameter of a barrel-cam member 106, the arms of the horseshoe being connected to flexibly mounted lugs 107 of member 106 at diametrically opposed locations. Cam member 106 is a collar longitudinally guided on a cylindrical surface of a stem portion 108 of end bell 17, and axially projecting cam-tooth formations 109 on member 106 and the adjacent hub portion of end bell 17 are operative to determine axial displacement of member 106, for angular shifts imparted by crank arm 104; in the course of such displacements away from the position shown in FIG. 1, the horseshoe plate 105 flexes, and the adjacent end of the clutch rocker arm 23 is caused to displace in the clockwise sense, eventually disconnecting the engagement to ring gear 46 when shift arm 12' is at or near the "neutral" end of the displacement $\delta_2$.

The disengaged condition will remain until selector arm 12' is returned to its "Hold" position, allowing spring 24 to return the dog-clutch rocker arm 23 into engagement with the next available dog-slot formation in ring gear 46. In the course of driven rotation of gear 46 and its plate 46', the dog-clutch rocker arm 23 is centrifugally urged to retain the dogged engagement. In the event of two diametrically opposed dog-clutch devices 23 on plate 46', a balanced condition is inherent (with respect to the axis of shaft 11), but for the single clutch element 23 shown, I have provided a suitable counterweight 23' fixed to plate 46'.

While the invention has been described in detail for the form shown, it will be understood that modifications may be made without departure from the invention. For example, the cam 65 may be curved rather than straight, as may be appropriate for particular non-linear characterizing purposes. Also, the means 91 will be understood to be suggestive of variation of the instantaneous pivot center of cam 61, whether selectively fixed or continuously variable.

What is claimed is:

1. A transmission comprising a housing, a drive shaft and a driven shaft journaled for rotation in said housing on a common axis, a variable-ratio coupling mechanism coupling said shafts, said mechanism including reaction means having torsionally resilient antirotational support about said axis in said housing, whereby in reaction to increasing torsional load said mechanism will be displaced in rotation about said axis and against increasing torsional resistance by said resilient means, said mechanism further including a control member for changing the coupling ratio between said input and output shafts, cam and follower elements reacting to such displacement and including a cam carried by said housing and a follower connected to said control member for modifying the instantaneous control condition of said control member, and means for varying the effective slope orientation of said cam, whereby the rate at which the coupling ratio is varied in response to load torque is a function of the instantaneous slope orientation of said cam.

2. In a traction-drive transmission, comprising a housing, a drive shaft journaled for rotation in said housing, two spaced sun wheels having keyed longitudinally relatively slidable support on said shaft, a sun gear keyed to said shaft, Belleville-washer means carried by said shaft and axially pre-loading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on angularly spaced axes offset front the shaft axes and in said planet-member carrier, whereby each of said planet wheels may have at least a degree of generally radial freedom at its guided angular position with respect to said carrier, planet gears carried by said planet-member carrier and meshing with said sun gear on angularly spaced axes offset from the shaft axis, two axially movable reaction rings having torsionally resilient anti-rotational support in said housing and in constant rolling contact with said planet wheels, an output shaft journaled for rotation in said housing on the alignment axis of said drive shaft, and a ring gear carried by said output shaft and meshing with said planet gears; and selectively operable shift means for varying the relative axial spacing of said reaction rings, said shift means including a yoke having arms pivotally supported by said housing an opposite sides of the shaft axis, first control connections of one reaction ring to said arms at a first location of offset from the pivot axis, and second control connections of the other reaction ring to a second location of offset from the pivot axis, said first and second control connections being at opposite offsets from the pivot axis of said yoke; the improvement in which said shift means comprises a yoke-actuating follower element carried by said yoke at a location radially offset from the yoke-pivot axis, a control member pivotally referenced to said housing and having an elongate guide in constant engagement with said follower element through the range of torsionally reactive angular displacement of said reaction rings in response to a range of output-drive loading, said control member being positioned such that one end of said guide positions said yoke for lowest transmission ratio at maximum output-drive loading, and selectively operable means for setting the pivoted orientation of said control member such that a maximum range of transmission ratios is available for lesser output-drive loading.

3. The transmission of claim 2, in which said guide is a cam forming part of said control member, and in which said follower element is a cam follower tracking said cam.

4. The transmission of claim 2, in which said selectively operable means includes a shift rod longitudinally guided in and by said housing, said rod having an actuating connection to said control member.

5. The transmission of claim 4, in which said control member comprises an arm connected at one end to said shift rod and in longitudinal abutment with said housing at its other end, said guide extending between said ends.

6. A traction-drive mechanism, comprising a housing, input and output shafts journaled for rotation on the same alignment in said frame, a variable-ratio assembly including a carrier mounted on one of said shafts and constantly engaged rotatable elements on said carrier and on said shafts for variable-ratio coupling of said shafts, torsionally compliant means coactive between said housing and said assembly for torsionally compliant angular displaceability of said assembly about said shaft alignment as a function of load-torque reaction, axially displaceable reaction rings forming part of said variable-ratio assembly for varying the input-output transmission ratio in accordance with the relative axial displacement of said rings, differentially operative means including a cam carried by said housing and a cam-follower carried by said assembly for varying the axial separation of said rings and thus for varying the input-output transmission ratio; and selectively operable means for varying the effective slope of said cam as encountered by said cam-follower in the course of a load-reacting torsional displacement of said assembly about said shaft alignment, the placement of said cam being such with respect to a no-load position of said cam-follower that increasing load-torque reaction displacement about said shaft alignment is operative to drive said cam-follower in the direction of lower transmission-ratio adjustment of said assembly.

7. A traction-drive mechanism according to claim 6, in which said cam is straight and is pivotally related to said housing at one end and is connected at its other end to said selectively operable means.

8. Traction-drive mechanism according to claim 6, in which said cam is elongate and wherein the range of cam orientation by said selectively operable means extends through a range of slopes with respect to a single radial plane containing said cam-follower under zero-transmission ratio conditions.

9. Traction-drive mechanism according to claim 6, in which said selectively operable means includes a control rod longitudinally guided with respect to said housing, said control rod being connected to said cam for selectively changing the orientation thereof.

10. A traction-drive mechanism, comprising a housing, input and output shafts journaled for rotation on the same alignment in said frame, a variable-ratio assembly including a carrier mounted on one of said shafts and constantly engaged rotatable elements on said carrier and on said shafts for variable-ratio coupling of said shafts, torsionally compliant means coactive between said housing and said assembly for torsionally compliant angular displaceability of said assembly as a function of load-torque reaction, axially displaceable reaction rings forming part of said variable-ratio assembly for varying the input-output transmission ratio in accordance with the relative axial displacement of said rings, differentially operative means including a cam carried by said housing and a cam-follower carried by said assembly for varying the axial separation of said rings and thus for varying the input-out transmission ratio; and selectively operable means including a control rod longitudinally guided with respect to said housing, said control rod being connected to said cam for varying the effective slope of said cam as encountered by said cam-follower in the course of a load-reacting torsional displacement of said assembly, the placement of said cam being such with respect to a no-load position of said cam-follower that increasing load-torque reaction displacement is operative to drive said cam-follower in the direction of lower transmission-ratio adjustment of said assembly, said control rod being also mounted for limited angular displaceability, and clutch means disengageably connecting coacting elements of said assembly, said clutch means having an operative connection of said control rod and being responsive solely to rotational displacement thereof.

11. Traction-drive mechanism according to claim 10, and including guidance means fixed with respect to said housing and coacting with said rod to constrain said rod for substantially purely longitudinal displacement for all position except substantially at the zero-transmission ratio position.

12. Traction-drive mechanism according to claim 11, wherein said control rod includes a radial-arm portion, and wherein said guidance means includes a control plate fixed with respect to said housing, said plate having slot formations for guidance of said arm.

13. Traction-drive mechanism according to claim 12, in which said slot formations include a transversely extending region at substantially the zero-transmission ratio position, the transverse extent of said region being such as to enable a clutch-disengaging rotational displacement of said arm and control rod.

* * * * *